United States Patent
Xu et al.

(10) Patent No.: US 6,404,492 B1
(45) Date of Patent: Jun. 11, 2002

(54) LIGHT SOURCE APPARATUS AND MEASUREMENT METHOD

(75) Inventors: Kexin Xu; Keiichi Fukada, both of Kyoto (JP)

(73) Assignee: Kyoto Daiichi Kagaku Co., Ltd., Kyoto (JP)

( * ) Notice: Subject to any disclaimer, the term of this patent is extended or adjusted under 35 U.S.C. 154(b) by 0 days.

(21) Appl. No.: 09/068,028

(22) PCT Filed: Oct. 30, 1996

(86) PCT No.: PCT/JP96/03182

§ 371 (c)(1), (2), (4) Date: Jul. 7, 1998

(87) PCT Pub. No.: WO97/16708

PCT Pub. Date: May 9, 1997

(51) Int. Cl.⁷ .................................................. G01J 3/28
(52) U.S. Cl. ...................................... 356/326; 356/328
(58) Field of Search ............................... 356/308, 326, 356/328; 250/335.07

(56) References Cited

U.S. PATENT DOCUMENTS

| | | | |
|---|---|---|---|
| 4,559,557 A | 12/1985 | Keyes et al. ................. | 358/111 |
| 4,805,623 A | 2/1989 | Jöbsis ......................... | 128/633 |
| 4,830,014 A | 5/1989 | Goodman et al. .......... | 128/665 |
| 4,883,963 A | * 11/1989 | Kemeny et al. ............ | 356/326 |
| 5,039,855 A | 8/1991 | Kemeny et al. ............ | 250/339 |
| 5,224,478 A | 7/1993 | Sakai et al. ................. | 128/633 |
| 5,226,417 A | 7/1993 | Swedlow et al. ........... | 128/633 |
| 5,435,309 A | 7/1995 | Thomas et al. ............. | 128/633 |
| 5,444,528 A | * 8/1995 | Puschell ..................... | 356/326 |
| 5,475,221 A | * 12/1995 | Want ........................... | 250/339.07 |
| 5,477,321 A | * 12/1995 | Johnson ..................... | 250/339.07 |
| 5,598,842 A | 2/1997 | Ishihara et al. ............ | 128/637 |
| 5,879,373 A | 3/1999 | Röper et al. ............... | 606/344 |
| 5,949,540 A | * 9/1999 | Matsuoka et al. ......... | 356/326 |

FOREIGN PATENT DOCUMENTS

| | | | |
|---|---|---|---|
| EP | 0 641 542 A2 | 3/1995 | ............ A61B/5/00 |
| EP | 0 722 691 A1 | 7/1996 | ............ A61B/6/00 |
| EP | 0 374 190 B1 | 1/1997 | ............ A61B/5/00 |
| JP | 54-77491 | 6/1979 | ........... A61B/10/00 |

(List continued on next page.)

OTHER PUBLICATIONS

Japanese Patent Office, "Patent Abstracts of Japan", Abstract for JP Patent Publication No. 62185126 A, published Aug. 13, 1987, p. 1.

(List continued on next page.)

Primary Examiner—Frank G. Font
Assistant Examiner—Zandra V. Smith
(74) Attorney, Agent, or Firm—Sterne, Kessler, Goldstein & Fox P.L.L.C.

(57) ABSTRACT

An acousto-optic tunable filter 4 including: an acousto-optic crystal 41; an acoustic wave driver 42; and a piezoelectric transducer 43, is provided in front of a light source section 2 including a plurality of light sources 2A, 2B, ... 2N having different wavelength characteristics. The frequency of RF generated by the acoustic wave driver 42 is varied in accordance with a desired wavelength. Thus, the light having the desired wavelength is incident on a converging lens 5 as plus and minus first-order light beams, and the light having wavelengths other than the desired wavelength is incident on a converging lens 5 as a zero-order light beam. The converging lens 5 converges the plus and minus first-order light beams and the zero-order light beams at positions different from each other. A selector 6 having openings located at the positions onto which the plus and first-order light beams are converged is provided in front of the converging lens 5. Therefore, only the light having the desired wavelength can pass through the selector 6 and is emitted from the light source apparatus 1.

4 Claims, 8 Drawing Sheets

FOREIGN PATENT DOCUMENTS

| | | | |
|---|---|---|---|
| JP | 60-207020 | 10/1985 | ............. G01J/3/42 |
| JP | 61-163602 | 7/1986 | ........... H01C/17/28 |
| JP | 61-165519 | 10/1986 | ........... G02B/27/00 |
| JP | 62-123526 | 8/1987 | ............. G01J/3/10 |
| JP | 62-185126 | 8/1987 | ............. G01J/3/02 |
| JP | 63-171329 | 7/1988 | ............. G01J/3/18 |
| JP | 1-316724 | 12/1989 | ............. G02F/1/33 |
| JP | 2-24102 | 7/1990 | ............. G02F/1/11 |
| JP | 3-500207 | 1/1991 | .......... G01N/21/27 |
| JP | 3-138537 | 6/1991 | ............. G01J/3/02 |
| JP | 4-76517 | 12/1992 | ............. H01S/3/10 |
| JP | 5-317295 | 12/1993 | ............. A61B/5/14 |
| JP | 6-201468 | 7/1994 | ............. G01J/3/12 |
| JP | 7-55565 | 3/1995 | ............. G01J/3/42 |
| JP | 7-329971 | 12/1995 | ............. B65D/19/26 |
| JP | 8-178751 | 7/1996 | ............. G01J/3/44 |
| JP | 8-215180 | 8/1996 | ............. A61B/5/14 |
| WO | WO 89/01758 | 3/1989 | ............. A61B/5/00 |

OTHER PUBLICATIONS

Japanese Patent Office, "Patent Abstracts of Japan", Abstract for JP Patent Publication No. 63171329 A, published Jul. 15, 1988, p. 1.

Japanese Patent Office, "Patent Abstracts of Japan", Abstract for JP Patent Publication No. 62172777 A, published Jul. 29, 1987, p. 1.

Dialog File 348 (EPO) English Language Patent Abstract for EP 722691 A1, published Jul. 24, 1996, p. 1.

Japanese Patent Office, "Patent Abstracts of Japan", Abstract for JP Patent Publication No. 60207020 A, published Oct. 18, 1985, p. 1.

Dialog File 347 (JAPIO) English Language Patent Abstract for JP 5–317295 A, published Dec. 3, 1993, p. 1.

Japanese Patent Office, "Patent Abstracts of Japan", Abstract for JP Patent Publication No. 07055565 A, published Mar. 3, 1995, p. 1.

Dialog File 347 (JAPIO) English Language Patent Abstract for JP 7–329971 A, published Dec. 19, 1995, p. 1.

Japanese Patent Office, "Patent Abstracts of Japan", Abstract for JP Patent Publication No. 01316724 A, published Dec. 21, 1989, p. 1.

Japanese Patent Office, "Patent Abstracts of Japan", Abstracts for JP Patent Publication No. 06201468 A, published Jul. 19, 1994, p. 1.

Japanese Patent Office, "Patent Abstracts of Japan", Abstract for JP Patent Publication No. 03138537 A, published Jun. 12, 1991, p. 1.

* cited by examiner

LIGHT SOURCE APPARATUS AND MEASUREMENT METHOD

TECHNICAL FIELD

The present invention relates to a light source apparatus for selecting or separating light having a required wavelength from light emitted from a single light source or a plurality of light sources and projecting the light. More particularly, the present invention relates to a light source apparatus used for obtaining information of a measured object based on the intensity of transmitted light or reflected light (including scattered light) obtained by irradiating the measured object with visible light or near-infrared light.

BACKGROUND ART

In recent years, various kinds of optical measurements have been performed using light transmitted through, reflected by, or scattered by, a measured object. In performing such an optical measurement, the intensity of transmitted light, reflected light, or scattered light, obtained by irradiating a measured object with light is detected, thereby obtaining information of the measured object.

Light having a preferred wavelength suitable for the measured object is selected as the light used for the measurement. On the other hand, even when the measurement is performed with respect to the same measured object, the intensity of the resulting transmitted light, reflected light, or scattered light, differs depending upon the wavelength selected for the measurement. Thus, a preferred wavelength must be selected in consideration of the measurement conditions. In order to realize highly sensitive measurement, it is necessary to project light including a light beam having the wavelength thus selected onto the measured object with high precision.

In performing such an optical measurement, a light source apparatus including a combination of at least one light source emitting light having a plurality of wavelengths and a plurality of filters having respectively different transmission wavelengths has conventionally been used. In such a conventional light source apparatus, a plurality of filters are movably provided. Depending on a wavelength used for measurement, one of the plurality of filters is selected and then moved to a position suitable for receiving a light emitted from the light source, including light with the required wavelength, thereby projecting the light beam with the wavelength used for measurement onto a measured object.

However, in such a conventional light source apparatus, in order to sequentially change the wavelengths of the light beams to be incident onto the same measured object (i.e., in order to perform a scanning of the wavelengths), the plurality of filters are required to be sequentially interchanged by mechanically moving a filter unit. Thus, such a conventional apparatus has a problem in that the configuration and the operation of the entire apparatus becomes complicated or the size thereof becomes large.

In addition, in a conventional light source apparatus, the quantity of light adversely becomes unstable depending upon the ambient temperature around the light source. Moreover, in the case where such a light source apparatus includes a plurality of light sources, every time a light source emitting light with the wavelength used for measurement is selected from the plurality of light sources, the power supplies of the light source are required to be turned ON/OFF. Thus, every time light sources are switched, it takes a significant period of time until the quantity of light is stabilized. Furthermore, since the light sources themselves have respectively different wavelength characteristics and a plurality of filters are used, the intensity of light emitted from the conventional light source apparatus varies depending on the wavelength thereof.

Furthermore, light which has been incident on the measured object and then transmitted through, reflected by or scattered by the measured object is used for performing the above-described optical measurement. Thus, the intensity of the light used for measurement is affected by the absorption of light by the measured object.

Figure 7:
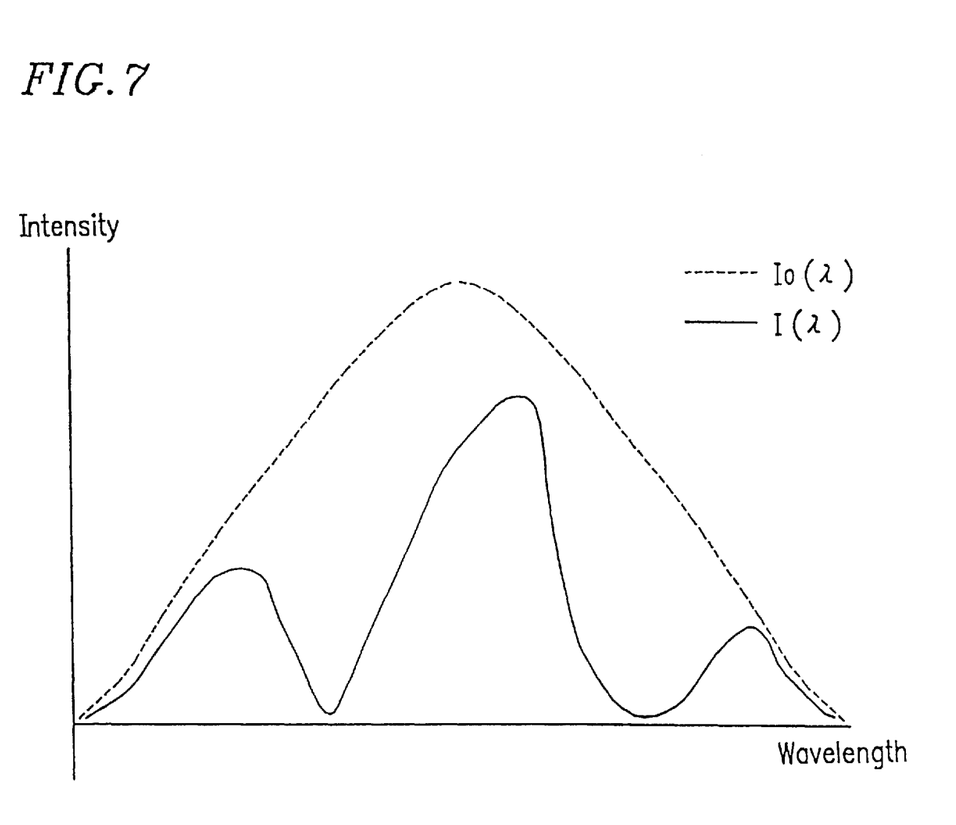
FIG. 7 is a figure illustrating exemplary wavelength characteristics of the light emitted from a conventional light source apparatus and the light for measurement obtained by irradiating a measured object with the emitted light.

An exemplary relationship between the intensity $I_0(\lambda)$ of the light irradiated onto the measured object and the intensity $I(\lambda)$ of the light transmitted through the measured object is shown in FIG. 7. As shown in FIG. 7, because the light has been absorbed by the measured object, the light intensity greatly differs between the incident light and the light used for measurement (in this case, the transmitted light). Therefore, in order to maximize the measurement resolution, the sensitivity of a light-receiving system is required to be varied in accordance with the intensity of the light used for measurement.

The present invention has been made in view of the above-mentioned circumstances and has objectives of providing a stable light source apparatus which can project a light beam having a wavelength required for measurement onto a measured object with high precision and also can eliminate the variation in the emission intensities with respect to the wavelengths, and providing a light source apparatus which can be operated easily and can be downsized.

DISCLOSURE OF INVENTION

The light source apparatus of this invention includes a light source section for emitting light having a plurality of wavelengths and a filter for selecting light having a single wavelength from the light having the plurality of wavelengths, and for separately outputting light having the selected wavelength, the selected wavelength being electrically variable, thereby realizing the above objectives.

An intensity of the light having the selected wavelength may be electrically variable.

The filter may be an acousto-optic tunable filter.

The filter may output the light having the selected wavelength in a direction different from directions in which remaining light having other wavelengths is output.

The filter may output the light having the selected wavelength as plus and minus first-order light beams and the remaining light as a zero-order light beam.

The light source apparatus may further include a combining member for combining the plus and minus first-order light beams into a single light beam.

The filter may output the light having the selected wavelength as ±m order light beams and the remaining light as a zero-order light beam, where m is an integer larger than 2.

The light source apparatus may further include a combining member for combining ±m order light beams into a single light beam.

The light source section may include a plurality of light sources.

The light source section may include a single light source.

The light source apparatus may further include a converging member for converging the light output from the filter.

The light source apparatus may further include a member for allowing the light having the selected wavelength to pass therethrough and blocking the other light.

The filter may be electrically adjusted such that the selected wavelength is sequentially varied while an intensity of the light having the selected wavelength is constant.

The filter may be electrically adjusted such that an intensity of the light having the selected wavelength is sequentially varied while the selected wavelength is constant.

The light source section may include laser diodes.

The light source section may include light-emitting diodes.

The plurality of light sources may emit a plurality of light beams having respectively different wavelength ranges.

The plurality of light sources may be arranged in an array.

The light source apparatus may further include a lens array which is provided between the light source section and the filter and has a plurality of lenses.

The measurement method of the invention uses light emitted from a light source apparatus which includes: a light source section for emitting light having a plurality of wavelengths; and a filter for selecting light having a single wavelength from the light having the plurality of wavelengths, and for separately outputting light having the selected wavelength, the selected wavelength being electrically variable. The method includes the steps of: irradiating a measured object with the light emitted from the light source apparatus; receiving light transmitted through, reflected by, or scattered, by the measured object; and performing a measurement with respect to the measured object based on the received light. In the irradiation step, at least one of the selected wavelength and an intensity of the light having the selected wavelength is sequentially varied, thereby realizing the above objectives.

Another measurement method of the invention uses light emitted from a light source apparatus which includes: a light source section for emitting light having a plurality of wavelengths; and a filter for selecting light having a single wavelength from the light having the plurality of wavelengths, and for separately outputting light having the selected wavelength, the selected wavelength being electrically variable. The method includes the steps of: irradiating a measured object with the light emitted from the light source apparatus; receiving light transmitted through, reflected by, or scattered by, the measured object as light for measurement; and performing a measurement with respect to the measured object based on the light for measurement. The method further includes a step of electrically adjusting the filter such that an intensity of the light for measurement becomes substantially constant without depending upon the selected wavelength, prior to the irradiation step, thereby realizing the above objectives.

BEST MODE FOR CARRYING OUT THE INVENTION

Hereinafter, an embodiment of the light source apparatus according to the present invention will be described with reference to the accompanying drawings.

Figure 1:
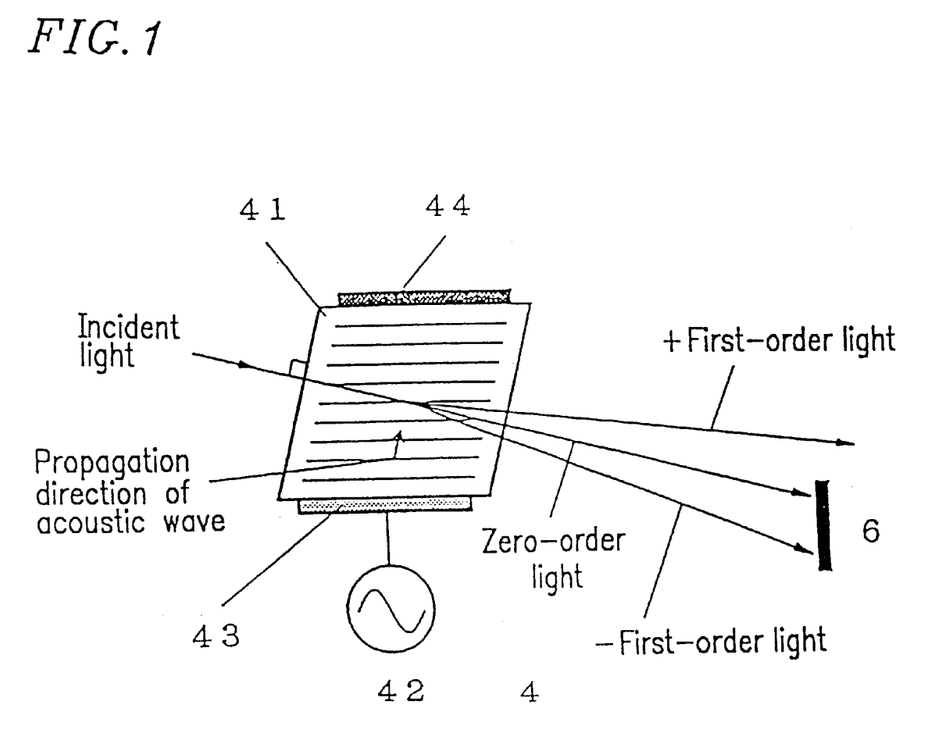
FIG. 1 shows the configuration of a filter used in the light source apparatus according to the present invention.

FIG. 1 illustrates a filter used for selectively outputting light having a single wavelength from light having a plurality of wavelengths in the light source apparatus according to the present invention. The filter is formed of an acousto-optic tunable filter (AOTF) which is a band pass filter for electrically scanning a wavelength. The acousto-optic tunable filter 4 includes: an acousto-optic crystal 41; an acoustic wave driver 42; a piezoelectric transducer 43; and an absorber 44. The acousto-optic tunable filter 4 receives incident light including a plurality of wavelength components and then selectively outputs light containing a single wavelength component and components in the vicinity of the single wavelength. The acousto-optic tunable filter 4 used in the light source apparatus according to the present invention is of a "non-collinear" type in which the propagation direction of the acoustic wave applied to the acousto-optic crystal 41 crosses the propagation direction of the light in the acousto-optic crystal 41. The acousto-optic crystal 41 herein is made of tellurium dioxide ($TeO_2$). The wavelength to be selected can be changed by varying the frequency of the RF signal supplied to the piezoelectric transducer 43 from the acoustic wave driver 42. Therefore, it is no longer necessary to provide a mechanical movable portion which has conventionally been necessary for moving the filters. In addition, it is not necessary to repeat the optical calibrations.

Hereinafter, the operation of the acousto-optic tunable filter 4 will be described with reference to FIG. 1.

When an RF signal generated by the acoustic wave driver 42 is supplied to the transducer 43, the RF signal is converted by the transducer 43 into an acoustic wave to be applied to the acousto-optic crystal 41. In the acousto-optic crystal 41, when the acoustic wave passes therethrough, a distortion is caused in the crystal lattice. This distortion of the crystal lattice functions as a grating for light having a single wavelength. Thus, the acousto-optic crystal 41 under the application of an acoustic wave selectively diffracts the light having the single wavelength and then outputs the light as plus and minus first-order diffracted light beams. That is, the angle of diffraction depends on the frequency of the acoustic wave applied to the acousto-optic crystal 41. Light having wavelengths other than the single wavelength transmitted through the acousto-optic crystal 41 outgoes as a zero-order diffracted light beam, toward a direction different from the directions of the plus and minus first-order diffracted light beams. Thus, light having a wavelength selected by the filter is separated from the remaining light having wavelengths other than the selected wavelength.

The wavelength of the light which is selectively diffracted by the acousto-optic crystal 41 is determined in accordance with the frequency of the acoustic wave. Therefore, the wavelength to be selected can be varied by varying the frequency of the RF signal generated by the acoustic wave driver 42. In addition, in the acousto-optic tunable filter, the intensity of the light outgoing from the acousto-optic crystal 41, i.e., the intensity of the diffracted light, is determined depending upon the power of the RF signal generated by the acoustic wave driver 42. Thus, if the power of the RF signal is adjusted, light having a desired intensity (quantity of light) can be obtained. As described above, since the light source apparatus according to the present invention uses an acousto-optic tunable filter 4, it is possible to electrically change the wavelength and the intensity (quantity) of light selected by the filter.

Next, the configuration of the light source apparatus according to the present invention will be described with reference to FIG. 2.

Figure 2:
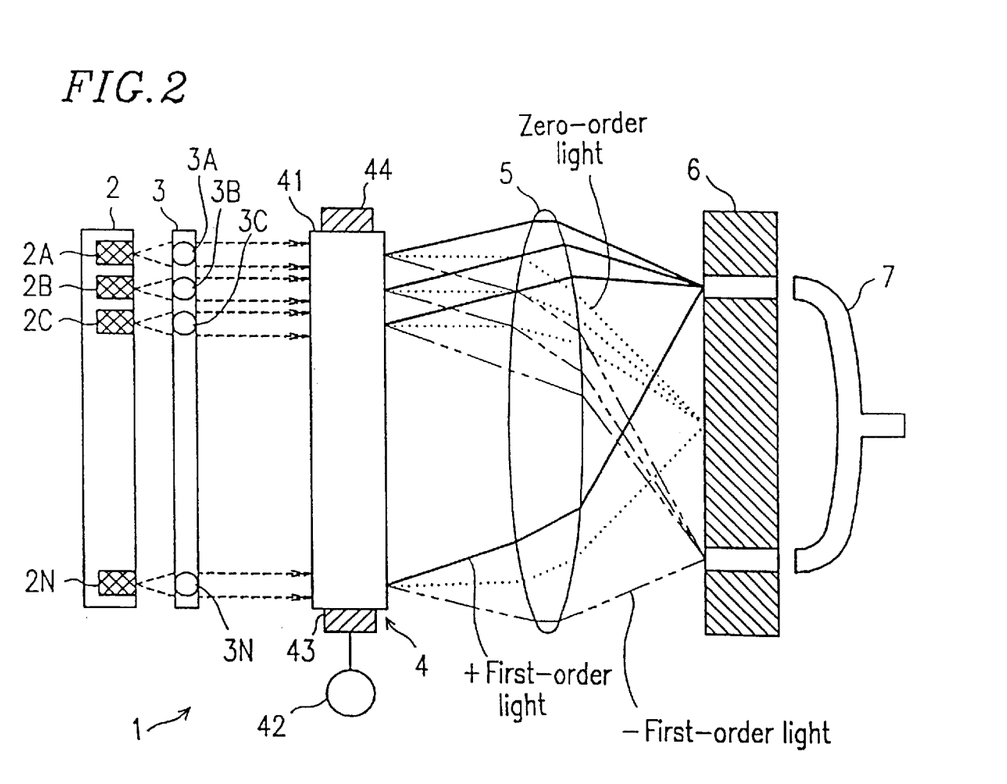
FIG. 2 is a cross-sectional view schematically showing the configuration of the light source apparatus according to the present invention.

FIG. 2 is a cross-sectional view schematically showing the configuration of the light source apparatus according to the present invention.

The light source apparatus 1 includes a light source section 2; a lens array 3; an acousto-optic tunable filter 4; a converging lens 5; a selector 6; and a combining element 7. The light source section 2 is configured so as to emit a plurality of light beams having a plurality of wavelength ranges. In this embodiment, a light source array including a plurality of light sources 2A, 2B, 2C, . . . 2N, which emit light beams having respectively different wavelengths, is used as the light source section 2. Preferably, a plurality of light sources having an equal output intensity are used as the light sources 2A, 2B, 2C, . . . 2N. The power supplies of these light sources are not required to be turned ON/OFF discontinuously as is done in a light source of a conventional light source apparatus. The reason is as follows: Since the wavelength to be separated is selected only by electrically adjusting the acousto-optic tunable filter 4, it is no longer necessary to select a light source in accordance with the wavelength to be selected as is done in a conventional light source apparatus. Laser diodes, light-emitting diodes or the like can be used as the plurality of light sources. Also, these light sources may be arranged either in one-dimension or two-dimension. Alternatively, a plurality of light sources may be arranged in a circular arrangement.

Instead of using a plurality of light sources, a single light source (e.g., a fluorescent lamp) which has broad wavelength characteristics or can emit light having various wavelengths may be used. Whether a plurality of light sources are used or a single light source is used, the power supply of each light source must be activated beforehand. Thus, the light source(s) can only be used in a state where the output of the power supply is stabilized and the quantity of light emitted from the light source is stable.

The lens array 3 is provided in front of the light source section 2. The lens array 3 collimates the plurality of light beams having a plurality of wavelengths which have been emitted from the light source section 2 into collimated light beams and then directs the collimated light beams be incident onto the acousto-optic tunable filter 4. In this embodiment, the lens array 3 includes the same number of converging lenses 3A, 3B, 3C, . . . 3N as the number of light sources constituting the light source array.

The light beams collimated by the lens array 3 are incident onto the acousto-optic tunable filter 4. The acousto-optic tunable filter 4 selectively diffracts light beams having a desired wavelength to direct the diffracted light beams as plus and minus first-order diffracted light beams toward directions different from the direction toward which light beams having wavelengths other than the desired wavelength is directed as a zero-order diffracted light beam, as described above. Thus, the acousto-optic tunable filter 4 outputs the plus and minus first-order light beams and the zero-order light beams in respectively different directions. The converging lens 5 receives the light beams output from the acousto-optic tunable filter 4 and then converges the plus and minus first-order light beams and the zero-order light beams at the respective positions corresponding to the incidence directions thereof. Accordingly, only the light having a desired wavelength is converged onto the positions different from the position onto which the light having other wavelengths is converged.

A selector 6 having two openings is provided in front of the converging lens 5. The selector 6 is disposed such that these two openings are located at the positions onto which the plus and minus first-order light beams are converged. Therefore, the light beams other than the light beams having a desired wavelength are blocked by the selector 6, so that the measured object is irradiated only with the plus and minus first-order light beams through the openings.

A combining element 7 is disposed in front of the selector 6. The combining element 7 combines the plus and minus first-order light beams which have passed through the openings of the selector 6 into a single light beam. In this embodiment, a multi-branch fiber having two input sections and one output section is used as the combining element 7. However, the combining element 7 is not limited to a multi-branch fiber. Alternatively, any arbitrary element can be used so long as the element can combine the plus and minus first-order light beams incident from two directions into one light beam to be output. For example, a light guide or the like can be used.

In this way, the light source apparatus 1 according to the present invention can separate light having a desired wavelength from light having a plurality of wavelengths merely by performing an electrical adjustment and then can emit the light at a desired intensity.

Figure 3:
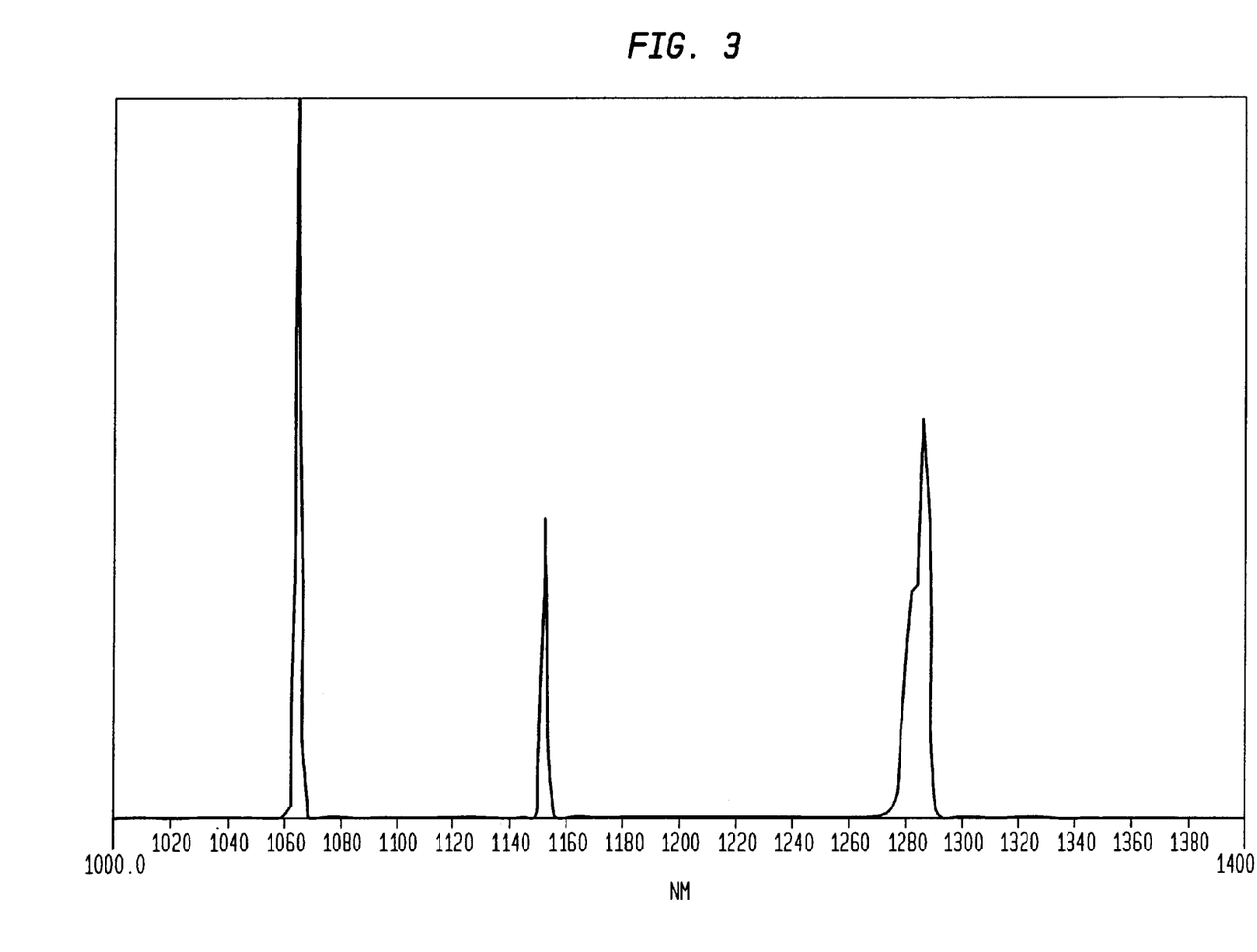
FIG. 3 is a figure illustrating an example of the wavelength characteristics of a light source section of the light source apparatus shown in FIG. 2.
Figure 4:
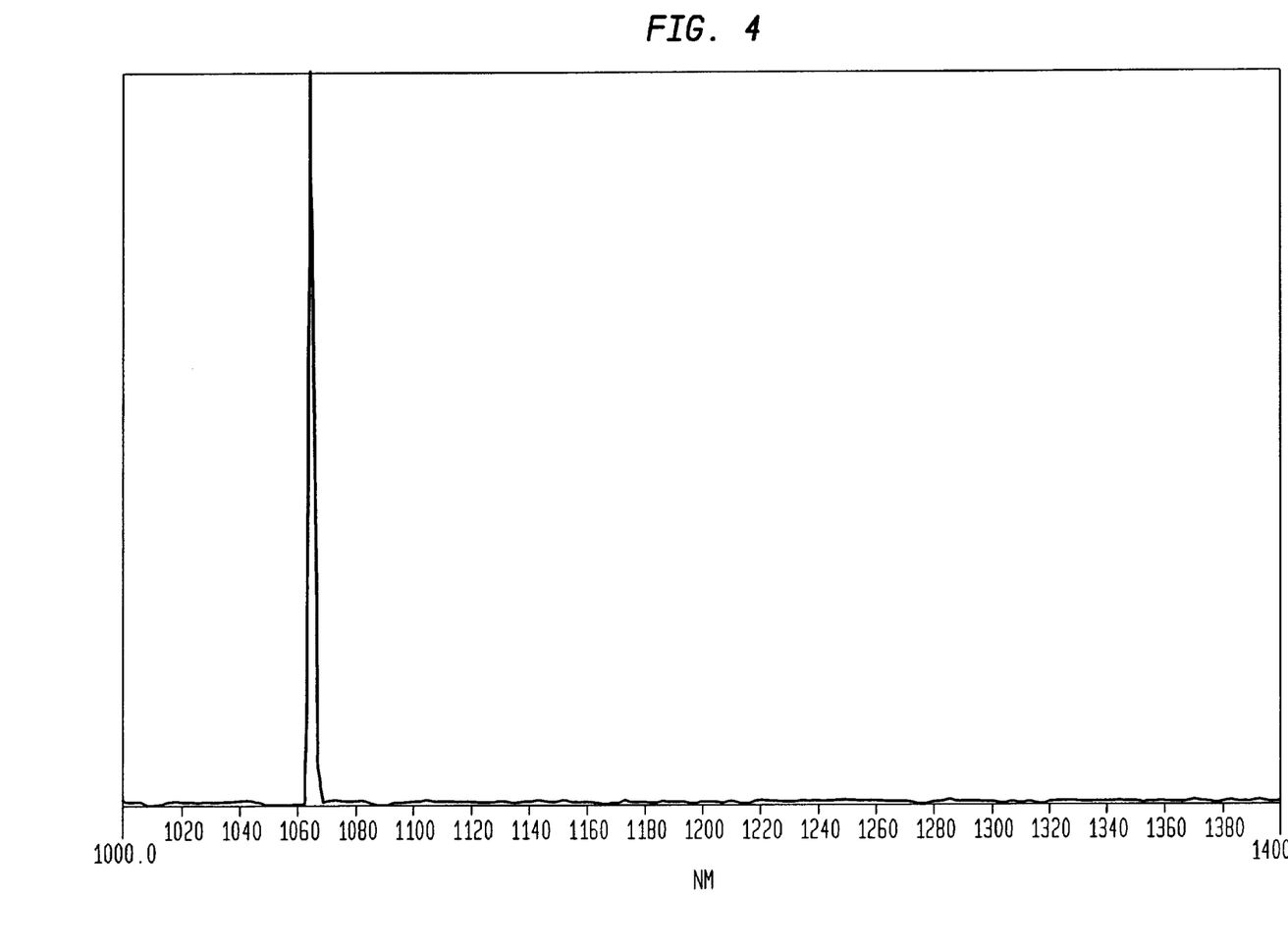
FIG. 4 is a figure illustrating an example of the wavelength characteristics of a light beam emitted from the light source apparatus shown in FIG. 2 when the light source section has the wavelength characteristics illustrated in FIG. 3.
Figure 5:
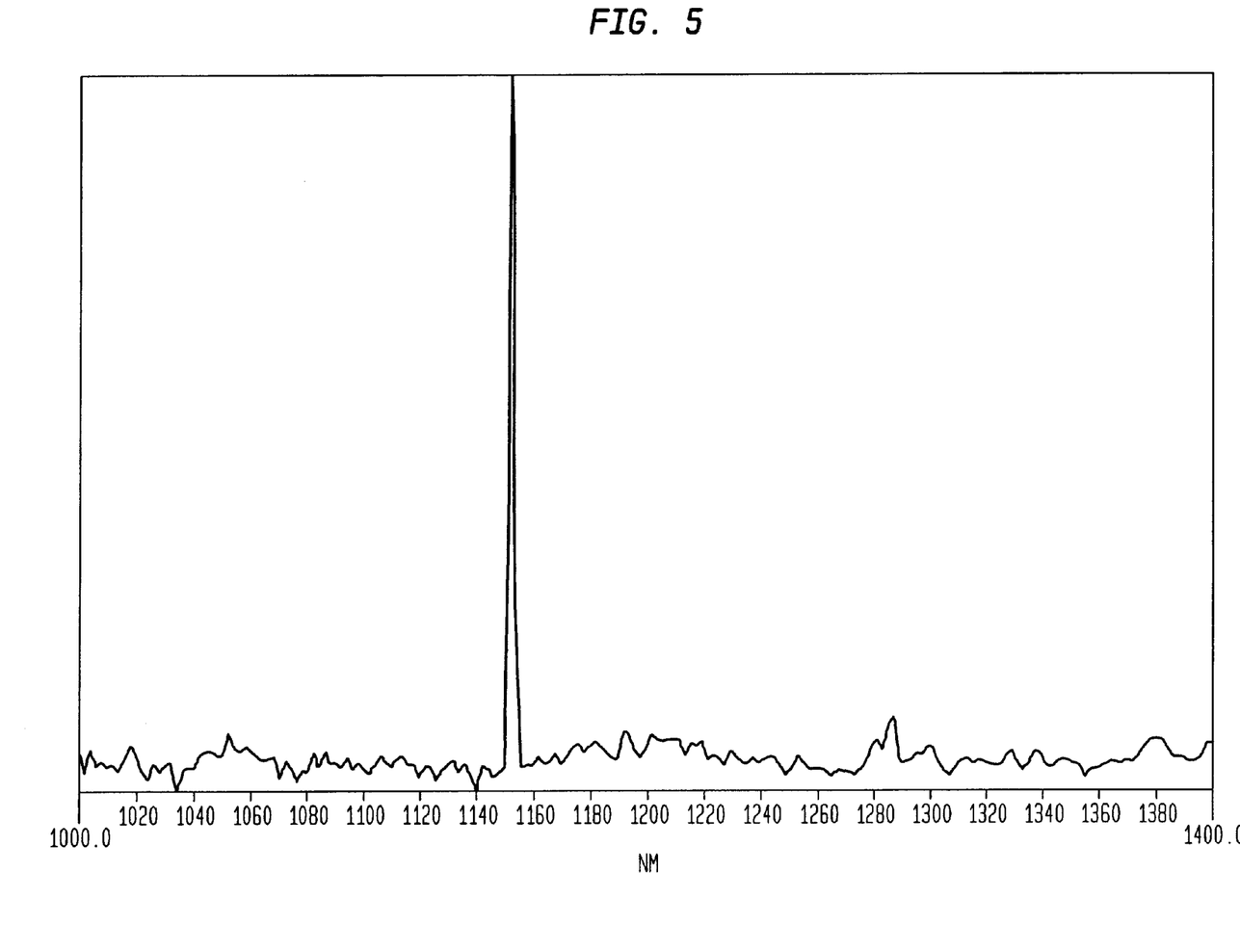
FIG. 5 is a figure illustrating another example of the wavelength characteristics of a light beam emitted from the light source apparatus shown in FIG. 2 when the light source section has the wavelength characteristics illustrated in FIG. 3.
Figure 6:
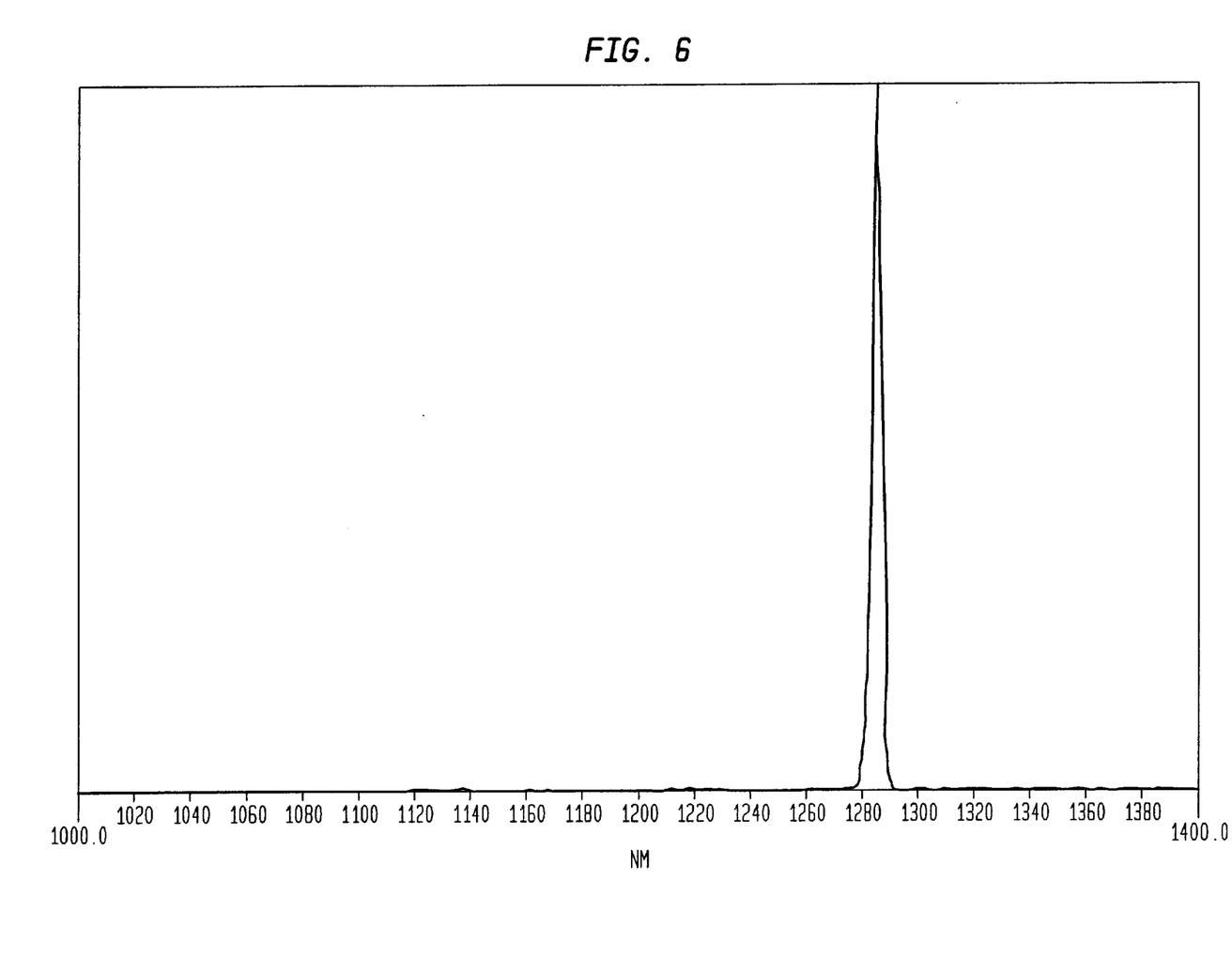
FIG. 6 is a figure illustrating still another example of the wavelength characteristics of a light beam emitted from the light source apparatus shown in FIG. 2 when the light source section has the wavelength characteristics illustrated in FIG. 3.

An example of the wavelength characteristics of the light source section 2 is illustrated in FIG. 3. In this example, the light source section 2 emits light beams having three different wavelengths of 1065 nm, 1153 nm and 1287 nm. In this embodiment, an array in which three laser diodes are arranged is used as the light source section 2. In this case, if the frequency of the acoustic wave driver 42 is set to be 90.665 MHz, then a light beam having a wavelength of 1065 nm can be selected as shown in FIG. 4. On the other hand, if the frequency of the acoustic wave driver 42 is set to be 83.746 MHz, then a light beam having a wavelength of 1153 nm can be selected as shown in FIG. 5. Furthermore, if the frequency of the acoustic wave driver 42 is set to be 75.260 MHz, then a light beam having a wavelength of 1287 nm can be selected as shown in FIG. 6. Thus, the light source apparatus according to the present invention can change the wavelength to be selected by the acousto-optic tunable filter 4 by varying the frequency of an electric signal supplied from the acoustic wave driver 42 to the transducer 43.

As described above, in the light source apparatus according to the present invention, the wavelength of the light emitted from the light source apparatus can be electrically adjusted. Therefore, if the light source apparatus according to the present invention is used, then it is possible to efficiently perform, for example, an optical measurement in which the wavelengths of the light to be incident on the same measured object are sequentially varied, a so-called "wavelength scanning". In addition, since it is possible to electrically adjust the wavelengths of the light emitted from the light source apparatus and also the intensities (or the quantity) of the light, it is also possible to efficiently perform an optical measurement in which the intensities of the light beams to be incident on the measured object are sequentially varied.

As described above, in the case of using a conventional light source apparatus, in order to sequentially vary the wavelengths of the light to be incident on one measured object, the operation and the mechanism of the light source apparatus become adversely complicated. Moreover, as shown in FIG. 7, even when the same measured object is measured, the intensities of the transmitted light, the reflected light or the scattered light obtained as the light for measurement are greatly varied depending upon the wavelengths of the light for irradiation. Thus, when a wavelength scanning is performed with respect to a measured object, it is necessary to vary not only the wavelengths but also the sensitivities of a light-receiving system for receiving the light for measurement.

Figure 8:
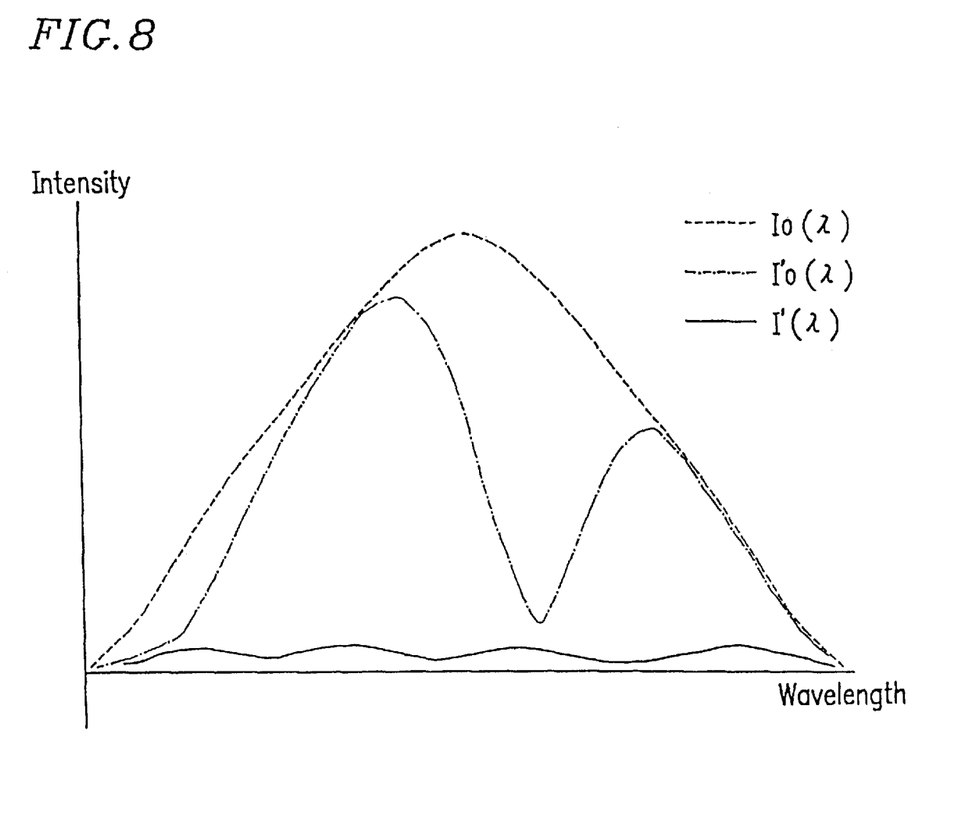
FIG. 8 is a figure illustrating the process steps for adjusting the intensities of the light beams emitted from the light source apparatus shown in FIG. 2 in performing an optical measurement using the light source apparatus.

On the other hand, if the light source apparatus according to the present invention is used, then such an optical measurement in which the wavelengths of the light incident on one measured object are sequentially varied can be performed in the following manner. First, light having arbitrary wavelength-intensity characteristics is emitted from the light source apparatus so as to be incident on a measured object. In this embodiment, the object is irradiated with light $I_0(\lambda)$ having wavelength characteristics represented by the broken line in FIG. 8. Next, based on the wavelength characteristics of the light obtained by this measurement, the incident light having such wavelength characteristics (the light intensity at each wavelength) as making the intensities of the light for measurement substantially constant with respect to each wavelength is determined. In this embodiment, the incident light $I_0'(\lambda)$ having wavelength characteristics represented by the one-dot chain in FIG. 8 is selected as the incident light which can make the intensities of the light for measurement substantially constant with respect to each wavelength.

Then, while adjusting the power of the acoustic wave driver 42 of the acousto-optic tunable filter 4 so that the wavelengths of the light selected by the acousto-optic filter 4 are sequentially changed. In this way, light for measurement $I'(\lambda)$ having substantially flat wavelength characteristics can be obtained.

As described above, if the light source apparatus according to the present invention is used, it is possible not only to easily perform an electrical scanning of the wavelengths with respect to the same measured object, but also make the intensity of the light for measurement obtained by the wavelength scanning substantially constant. Therefore, it is no longer necessary to vary the sensitivity of a light-receiving system used for the measurement in accordance with the wavelengths. In addition, it is also possible to set the measurement area of a light-receiving system to be narrow. Alternatively, in electrically adjusting the intensity of the light emitted from the light source apparatus, it is also possible to adjust the power of the acoustic wave driver of the acousto-optic tunable filter in accordance with the measurement area of the light-receiving system.

In the above described embodiment, an array of a plurality of light sources is assumed to be used as the light source section 2. Alternatively, the light sources may be arranged as a one-dimensional array or a two-dimensional array or in a circular arrangement.

Also, in the above-described embodiment, a lens array 3 is used for directing the light emitted from the light source section 2 be incident onto the acousto-optic tunable filter 4. However, even in the case of using a multi-branch fiber having a plurality of light inputs respectively corresponding to the plurality of light sources and one light output, instead of the lens array 3, for example, the light emitted from the light source section 2 can be efficiently converged onto the acousto-optic tunable filter 4.

In the above embodiment, an example in which light having a selected wavelength is separated as plus and minus first-order diffracted light beams, has been described. However, the present invention is not limited thereto, the light having a selected wavelength may be separated as higher order diffracted light beams (±m order light beams, m is an integer larger than 2).

INDUSTRIAL APPLICABILITY

As is apparent from the foregoing description, the light source apparatus according to the present invention selects light having a single wavelength from light having a plurality of wavelengths and then outputs the selected light beam separately from the remaining light beams having other wavelengths. The wavelength to be selected can be changed by electrically varying the set values of the filter. More specifically, the wavelength of light to be separated can be changed by varying the frequency of the RF signal generated by the acoustic wave driver of the acousto-optic filter used as a filter. Therefore, it is no longer necessary to provide a plurality of filters so as to correspond to the respective wavelengths and interchange the filters in accordance with the wavelength to be selected, so that the configuration and the operation of the light source apparatus can be simplified and the size of the entire light source apparatus can be reduced. In addition, light having a desired wavelength can be obtained with high precision.

Moreover, the light source apparatus according to the present invention can electrically vary the wavelength to be selected by the filter and also the intensity of the light beam to be selected by and output from the filter. Specifically, by varying the RF power of the acoustic wave driver of the acousto-optic tunable filter used as the filter of the invention, the intensity of the light output from the acousto-optic tunable filter can be varied.

Furthermore, in the light source apparatus according to the present invention, the wavelength of the light emitted from the light source apparatus is electrically selected by the filter. Thus, even when a plurality of light sources are provided, it is no longer necessary to turn ON/OFF the power of the light sources as is done in a conventional apparatus. Since the light sources can always be set in a light-emission state, the variation in the quantity (or the intensity) of the light emitted from the light source apparatus can be reduced. Moreover, since the light having the selected wavelength is separated by the filter from the remaining light beams having other wavelengths, it is no longer necessary to separate light into a plurality of light beams having a plurality of wavelengths and then make the light beams be incident onto the filter. Consequently, the configuration of the light source apparatus can be simplified.

Moreover, the light source apparatus according to the present invention can converge the light having a selected wavelength even when the light has been separated from the remaining light having other wavelengths.

Furthermore, the light source apparatus according to the present invention can efficiently converge the light having a plurality of wavelengths, which have been emitted from the light source section, onto the filter. If an array in which a plurality of light sources are arranged is used as the light source section and either a lens array disposed so as to correspond to the light sources or a multi-branch fiber having a plurality of light inputs corresponding to the light sources is disposed in front of the light source array, then it is possible to converge the light emitted from the light source section onto the filer more efficiently.

If a plurality of light sources emitting a plurality of light beams having respectively different wavelength ranges are used for the light source section, then the wavelength range of the light emitted from the light source apparatus can be enlarged.

What is claimed is:

1. A light source apparatus comprising:

a light source section for emitting light having a plurality of wavelengths;

a filter for selecting light having a single wavelength from the light having the plurality of wavelengths, and for separately outputting light having the selected wavelength, the selected wavelength being electrically variable, wherein the filter outputs the light having the selected wavelength as ±m order light beams and the remaining light as a zero-order light beam, where the ±m order light beams are output in directions which are different from a direction in which the zero-order light beam is output, and m is an integer equal to or larger than 1; and a combining member for combining the ±m order light beams into a single light beam, wherein the light source section comprises a plurality of light sources.

2. A light source apparatus comprising:

a light source section for emitting light having a plurality of wavelengths;

a filter for selecting light having a single wavelength from the light having the plurality of wavelengths, and for separately outputting light having the selected wavelength, the selected wavelength being electrically variable, wherein the filter outputs the light having the selected wavelength as ±m order light beams and the remaining light as a zero-order light beam, where the ±m order light beams are output in directions which are different from a direction in which the zero-order light beam is output, and m is an integer equal to or larger than 1; and a combining member for combining the ±m order light beams into a single light beam, further comprising a member for allowing the ±m order light beams to pass therethrough and blocking the zero-order light beam.

3. A measurement method for performing a measurement with respect to a measured object using light emitted from a light source apparatus, the method comprising the steps of:

emitting light having a plurality of wavelengths;

passing the emitted light through a lens array;

filtering the emitted and passed light, said filtering step including the steps of selecting light having a single wavelength from the light having the plurality of wavelengths, and separately outputting light having the selected wavelength in at ±m order light beams, the selected wavelength being electrically variable in said filtering; and combining at least the ±m order light beams into a single combined light beam;

irradiating the measured object with the combined light beam;

receiving light transmitted through, reflected by, or scattered by, the measured object, as light for measurement; and performing a measurement with respect to the measured object based on the received light, wherein the filtering step further comprises a step of electrically adjusting such that an intensity of the light irradiating in said irradiating step for measurement becomes substantially constant without depending upon the selected wavelength, prior to the irradiation step.

4. A light source apparatus comprising:

a light source section that emits light having a plurality of wavelengths;

a filter that selects light having a single wavelength from the light having the plurality of wavelengths, and separately outputs light having the selected wavelength, wherein the filter outputs the light having the selected wavelength as ±m order light beams and the remaining light as a zero-order light beam, where the ±m order light beams are output in directions which are different from a direction in which the zero-order light beam is output, and m is an integer equal to or larger than 1;

a lens array, which is provided between the light source section and the filter; and a combining member that combines the ±m order light beams into a single output light beam; wherein said filter is electrically adjusted such that the intensity of the single output light beam is substantially constant at each of the plurality of wavelengths.

* * * * *